United States Patent
Bilgen et al.

(10) Patent No.: US 9,507,519 B2
(45) Date of Patent: Nov. 29, 2016

(54) METHODS AND APPARATUS FOR DYNAMICALLY ADAPTING A VIRTUAL KEYBOARD

(75) Inventors: Aras Bilgen, Istanbul, OR (US); James Ketrenos, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 392 days.

(21) Appl. No.: 13/994,830

(22) PCT Filed: Dec. 8, 2011

(86) PCT No.: PCT/US2011/064019
§ 371 (c)(1),
(2), (4) Date: Jun. 17, 2013

(87) PCT Pub. No.: WO2013/085528
PCT Pub. Date: Jun. 13, 2013

(65) Prior Publication Data
US 2013/0283195 A1    Oct. 24, 2013

(51) Int. Cl.
*G06F 3/048*    (2013.01)
*G06F 3/0488*   (2013.01)
*G06F 3/0485*   (2013.01)

(52) U.S. Cl.
CPC ......... *G06F 3/04886* (2013.01); *G06F 3/0485* (2013.01)

(58) Field of Classification Search
CPC .......................... G06F 3/04886; G06F 3/0485
USPC ................................................. 715/767, 773
See application file for complete search history.

(56) References Cited

U.S. PATENT DOCUMENTS

| 8,321,810 B2 * | 11/2012 | Heintze ................. G06F 3/0202 345/172 |
| 2002/0075317 A1 * | 6/2002 | Dardick ................ G06F 3/0481 715/808 |

(Continued)

FOREIGN PATENT DOCUMENTS

| CN | 1620660 A   | 5/2005 |
| CN | 101075188 A | 11/2007 |

(Continued)

OTHER PUBLICATIONS

International Preliminary Report on Patentability and Written Opinion received for PCT Patent Application PCT/US2011/064019, mailed on Jun. 19, 2014, 6 pages.

(Continued)

*Primary Examiner* — William Bashore
*Assistant Examiner* — Gregory A Distefano
(74) *Attorney, Agent, or Firm* — Barre Law Firm, PLLC (57) ABSTRACT

In one example embodiment, a mobile computing device displays at least part of an electronic form containing input objects to accept user input. A virtual keyboard module parses the form to discover attributes of the input objects and automatically determines whether the form includes a command button or other non-textual input object, based on results of the parsing. In response to discovering that the form includes a non-textual input object, the virtual keyboard module automatically adds a corresponding non-textual virtual keyboard component to a virtual keyboard, and the virtual keyboard module displays the virtual keyboard with the added non-textual virtual keyboard component on the display of the mobile device. The added non-textual virtual keyboard component may be configured to allow a user to invoke, from the virtual keyboard, a function associated with the corresponding non-textual input object in the form. Other embodiments are described and claimed.

27 Claims, 9 Drawing Sheets

(56) References Cited

U.S. PATENT DOCUMENTS

| | | | | |
|---|---|---|---|---|
| 2003/0074647 | A1* | 4/2003 | Andrew | G06F 9/4443 |
| | | | | 717/100 |
| 2004/0138569 | A1* | 7/2004 | Grunwald | A61B 8/00 |
| | | | | 600/459 |
| 2004/0205156 | A1* | 10/2004 | Aarts | G06F 17/30014 |
| | | | | 709/218 |
| 2005/0200907 | A1* | 9/2005 | Kitayama | G06Q 10/10 |
| | | | | 358/444 |
| 2006/0253478 | A1* | 11/2006 | Graham | G06F 17/243 |
| 2007/0213090 | A1* | 9/2007 | Holmberg | G06F 3/04886 |
| | | | | 455/550.1 |
| 2008/0082909 | A1* | 4/2008 | Zuverink | G06F 3/0481 |
| | | | | 715/224 |
| 2009/0024574 | A1 | 1/2009 | Timmons | |
| 2010/0100839 | A1 | 4/2010 | Tseng et al. | |
| 2010/0265183 | A1* | 10/2010 | Mail | G06F 3/0238 |
| | | | | 345/168 |
| 2011/0078613 | A1 | 3/2011 | Bangalore | |
| 2011/0260976 | A1* | 10/2011 | Larsen | G06F 3/04886 |
| | | | | 345/168 |
| 2011/0314405 | A1* | 12/2011 | Turner | G06F 3/0238 |
| | | | | 715/773 |
| 2013/0162411 | A1* | 6/2013 | Moses | H04N 21/4126 |
| | | | | 340/12.5 |

FOREIGN PATENT DOCUMENTS

| | | |
|---|---|---|
| CN | 102033609 A | 4/2011 |
| CN | 103959206 A | 7/2014 |
| DE | 112011105933 T5 | 11/2014 |
| KR | 20050096883 | 10/2005 |
| KR | 20100070759 | 6/2010 |
| WO | 03054733 A2 | 7/2003 |
| WO | 2009/104940 A2 | 8/2009 |
| WO | 2013085528 A1 | 6/2013 |

OTHER PUBLICATIONS

Stackoverflow, "Android Soft keyboard action button", Last accessed from http://stackoverflow.com/questions/6007204/android-soft-keyboard-action-button, Nov. 23, 2011, 2 Pages.

Stackoverflow, "How to get keyboard with Next, Previous and Done Button?", Iphone, Last accessed from http://stackoverflow.com/questions/5591792/how-to-get-keyboard-with-next-previous-and-done-button, Nov. 15, 2011, 2 Pages.

Androidcentral, "Keyboard button", Android Forums, Last accessed from http://forums.androidcentral.com/general-help-how/76017-keyboard-button-com.html, Oct. 18, 2011, 10 Pages.

Maliit, "Features", Features—Maliit wiki, Last accessed from http://wiki.maliit.org/Features, Nov. 15, 2011, 2 Pages.

Maliit, "Main Page", Main Page—Mliit wiki, Last accessed from http://wiki.maliit.org/Main Page, Nov. 15, 2011, 2 Pages.

International Search Report and Written Opinion received for International Application No. PCT/US2011/064019, mailed on Jul. 31, 2012; 9 pages.

Office Action received for Chinese Patent Application No. 201180075349.6, mailed on Jan. 12, 2016, 8 pages of English Translation and 5 pages of Chinese Office Action.

Notice of Allowance received for Chinese Patent Application No. 201180075349.6, mailed on Jun. 30, 2016, 4 pages of Notice of Allowance including 2 pages of English Translation.

* cited by examiner

METHODS AND APPARATUS FOR DYNAMICALLY ADAPTING A VIRTUAL KEYBOARD

TECHNICAL FIELD

The present disclosure relates in general to data processing systems. More particularly, the present disclosure relates to virtual keyboards for data processing systems such as handheld mobile computing devices, for example.

BACKGROUND

When a person (the "user") interacts with a software application on a data processing system, the software application may cause the data processing system to display various input objects for collecting information from the user. These input objects may include text fields and other user interface (UI) objects. For instance, an email application may present a pop-up window that prompts the user for login credentials, a bookkeeping application may present a user interface for recording business expenses, or an Internet browser application may present a web page for registering with a social interaction website or a window for participating in online chat.

For purposes of this disclosure, the nouns "display" and "monitor" refer to the hardware component that a data processing system uses to present visual information to the user. The noun "screen" refers to all of the content presented on a monitor at a particular point in time. The noun "window" refers to a portion of the display used by an application to present a set of related content items together. The noun "page" refers to a set of related content items to be presented together in a single window, even though all of the items may not fit in the window at one time; and scrolling, panning, and/or zooming may be necessary to bring some parts of the page into the window. The noun "electronic form" refers to a page containing one or more input objects for collecting information from the user. Thus, for example, a data processing system may present a screen containing multiple windows. One of those windows may present a web page from a web-based email application. That page may include input objects for registering with the email application. Accordingly, that page may be referred to as an electronic form. A portion of the electronic form may be visible in the window. The user may scroll down in the window to see more of the electronic form.

Filling out electronic forms on a desktop or laptop computer with a full-sized monitor, a separate full-sized keyboard, and a mouse or other pointing device may be relatively easy. The full-sized monitor may enable the user to see most or all of the text fields and other UI objects of the electronic form. The full-sized keyboard may include a "Tab" key that allows the user to easily navigate between adjacent text fields of the electronic form. And the mouse may enable the user to interact with particular input objects on the electronic form (e.g., buttons for functions like submit, save, or send)—as long as the electronic form is small enough or the monitor screen is large enough to display those input objects along with the rest of the form.

However, in recent years, some data processing systems have been designed to operate without separate input devices such as keyboards and mice. For instance, a handheld mobile computing device (a "handheld device") may use touchscreen technology to provide for both visual output and user input through the display screen. In particular, the handheld device may present, on its display, a collection of buttons and/or other objects ("virtual keyboard components") that together look like a keyboard. And when the user touches virtual keyboard components that look like keys, the handheld device may respond as if the user had pressed corresponding keys on an actual keyboard. For purposes of this disclosure, the term "virtual keyboard" denotes a collection of selectable virtual keyboard components (e.g., alphanumeric buttons) displayed by a data processing system in a predetermined portion of the display screen. That portion of the display screen may be referred to as the virtual keyboard frame or window. The term "conventional keyboard," by contrast, denotes a physical keyboard that is distinct from the display. Similarly, the term "key" refers to a part of a conventional keyboard to be depressed to provide user input, while the term "virtual key" refers to a selectable virtual keyboard component displayed as part of a virtual keyboard. As indicated above, virtual keys may also be referred to as buttons.

Typically, the operating system (OS) of a handheld device will provide a standard virtual keyboard, and applications which execute on that device may use that standard virtual keyboard by default. Since such a virtual keyboard can be used by multiple applications, it may be called a general purpose virtual keyboard. Also, third parties may create virtual keyboards with different features, for installation and use on handheld devices. For example, the Swype™ virtual keyboard, by Swype, Inc., allows a user to select a series of virtual keys without lifting his or her finger in between the keys, and a handheld device may allow its user to install and use the Swype™ keyboard instead of the standard virtual keyboard. Since such a virtual keyboard can also be used by multiple applications, it may also be called a general purpose virtual keyboard. In addition, it may be possible for a developer of a software application to create a new virtual keyboard specifically for that application. It may even be possible for that developer to create different virtual keyboards with different virtual keys for each different screen or electronic form in that application. These kinds of virtual keyboards may be referred to as application-specific virtual keyboards or form-specific virtual keyboards. However, there are many reasons for application developers to avoid application-specific virtual keyboards and form-specific virtual keyboards, including reasons pertaining to the time and costs associated with creating and maintaining such virtual keyboards. Consequently, applications for handheld devices typically use general purpose virtual keyboards provided by the OS.

Virtual keyboards make it possible for developers of handheld devices to produce devices with smaller sizes and fewer mechanical parts, relative to devices with a monitor and a separate conventional keyboard. However, filling out electronic forms on a handheld device with a virtual keyboard may be quite challenging. For example, some users prefer the feel of a physical keyboard with keys that depress. In addition, the size of the display screen may cause many challenges, because the handheld device may use a small screen which provides only a very limited amount of space or "real estate" to display information for the user.

For instance, if an electronic form for a handheld device includes much content, the user may need to zoom in on part of the electronic form to make the text or other UI objects in that part large enough to read and use, due to the small size of the screen. However, zooming in typically reduces the proportion of the electronic form that is visible on the screen, with the parts of the form that end up outside the bounds of the display being lost to sight. Moreover, these kinds of challenges are exacerbated when much of the screen is occupied by the virtual keyboard. In addition, the virtual keyboard may not provide any virtual keys that operate like the Tab key of a conventional keyboard to aid in navigating inside the electronic form. Consequently, the user may need to use additional zooming operations, as well as panning operations and selecting operations, to view and select input objects on those parts of the electronic form that have been zoomed off the screen.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION OF ONE OR MORE EMBODIMENTS

A general purpose virtual keyboard may be arranged, by default, basically like a standard QWERTY keyboard. Also, by tapping an option button on the virtual keyboard, the user may cause the available virtual keys or buttons to change. For example, by tapping a "SYM" button, the user may cause the virtual keyboard to change to show numerals and common symbols, instead of alphabetic characters. A general purpose virtual keyboard with virtual keys that do not change unless that change is requested by the user (e.g., by touching a "SYM" button or a "Shift" button) may be referred to as a static virtual keyboard.

When a person uses a handheld device with a static virtual keyboard to interact with an electronic form, that person may need to perform many different operations, and at least some of those operations may be rather difficult. To start, the user may need to zoom in to increase the size of the text and other UI objects in the electronic form to a readable size. The user may then need to select a first field for input (e.g., a username field). In response to the user selecting an alphanumeric input field, the OS may automatically cause a virtual keyboard to be displayed (or "pop up") in a predetermined portion of the screen, while also causing a blinking cursor to be displayed at the beginning of the selected input field. When an input field has been selected, that field may be referred to as active or as having focus. Similarly, when the virtual keyboard is displayed, it may be considered active, and when it is not displayed, it may be considered inactive. When the virtual keyboard is active, the virtual keyboard window may cover the bottom half of the display space, thereby significantly diminishing the space available to display the electronic form. Consequently, the virtual keyboard is likely to obscure text fields and other UI objects in the electronic form (e.g., command buttons for functions such submit, save, or send.).

In any case, after the virtual keyboard pops up, the user may use the virtual keyboard to enter alphanumeric data for the active input field. After entering the desired data for the first input field, the user may need to zoom out and/or pan the electronic form across the screen to bring the next input field into view in the part of the screen that is not occupied by the virtual keyboard. The user may then need to zoom in to make text in the electronic form big enough to be read, to verify that he or she has found the next desired input field. The user may then select that input field and use the virtual keyboard to enter additional data. The process of panning, zooming, selecting, and entering may continue until the user has entered all of the data required by the electronic form. The user may then do additional zooming and panning to find and select a UI object for a desired action (e.g., submit, save, or send). In addition, throughout this process, if input objects are small and/or close together, it may be difficult to select a desired input object.

According to the present disclosure, in at least one embodiment, a virtual keyboard module parses the particular electronic form in use, and dynamically modifies a virtual keyboard, based on discovered attributes of that form. Thus, the virtual keyboard module provides a dynamically customized, general purpose, virtual keyboard.

For instance, if the virtual keyboard module discovers that an electronic form has more than one input object, the virtual keyboard module may automatically add one or two navigation buttons to the virtual keyboard (e.g., a "Next" button and a "Prev" button), with those navigation buttons enabling the user to easily change focus from the current input object to the next input object or the previous input object.

In addition, the virtual keyboard module may automatically detect command buttons in the form, and in response, automatically add corresponding command buttons to the virtual keyboard. For example, if the electronic form is a pop-up window for login credentials, with text fields for userid and password, as well as "Submit" and "Cancel" buttons, the virtual keyboard module may automatically add a "Submit" button to the virtual keyboard. When the user taps the "Submit" button in the virtual keyboard, the virtual keyboard module may convert that input into input to indicate that the user selected the "Submit" button on the form, and the underlying application may then process the input accordingly. The virtual keyboard module may also automatically detect other input objects in the form, and in response, automatically add corresponding virtual keyboard components to the virtual keyboard. For example, if the electronic form includes an input object for selecting a color, the virtual keyboard module may automatically add a color picker to the virtual keyboard, and if the electronic form includes a text field for receiving date data, the virtual keyboard module may add a date picker to the virtual keyboard.

Figure 1:
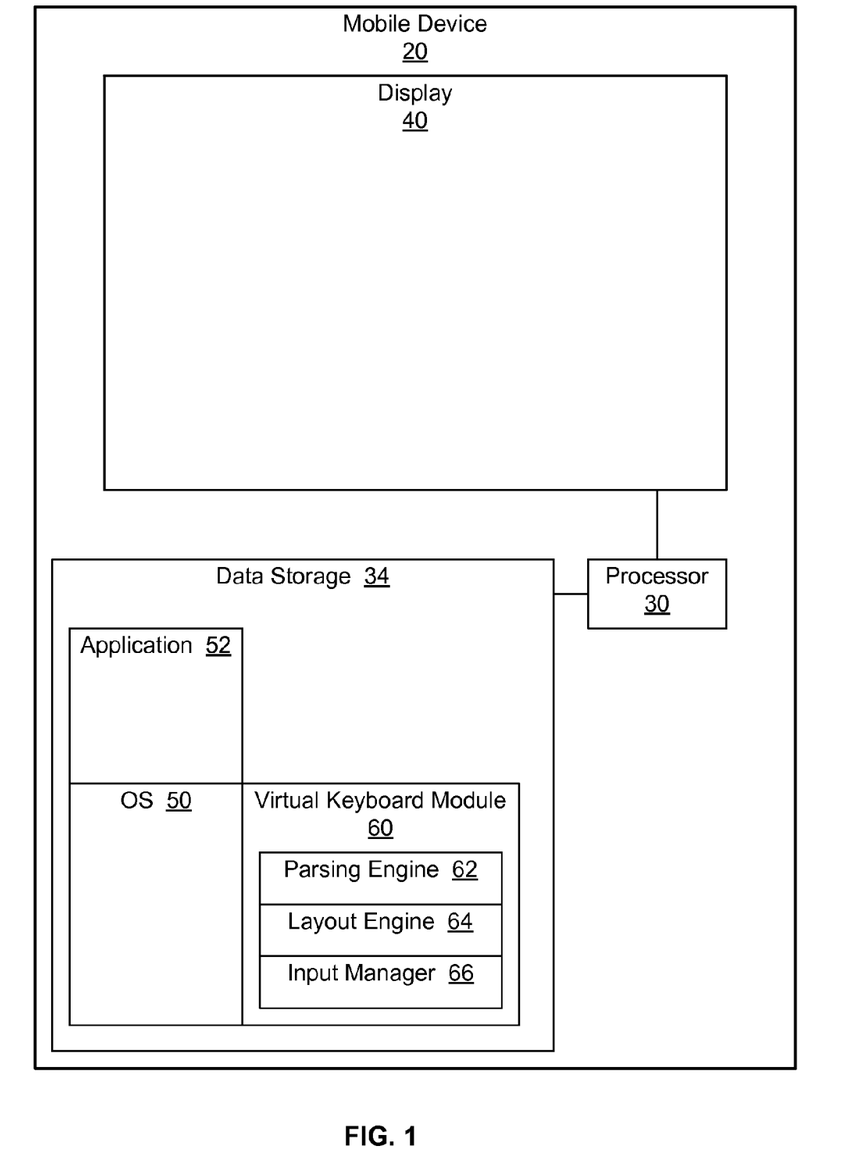
FIG. 1 is a block diagram of a data processing system with a virtual keyboard module according to at least one example embodiment.

FIG. 1 is a block diagram of a data processing system 20 with a virtual keyboard module 60, according to one example embodiment. In the illustrated embodiment, data processing system 20 is a handheld mobile computing device 20 with at least one processor 30, as well as data storage 34 and a display 40 responsive to processor 30. In the illustrated embodiment, virtual keyboard module 60 is implemented as software that is stored in data storage 34 and executed by processor 30 to provide the functionality described below. An OS 50 and one or more applications 52 are also stored in data storage 34, and when those components execute on processor 30, they may invoke virtual keyboard module 60. In the embodiment of FIG. 1, virtual keyboard module 60 includes a parsing engine 62, a layout engine 64, and an input manager 66. As described in greater detail below, parsing engine 62, layout engine 64, and input manager 66 cooperate to provide for dynamic adaptation of the virtual keyboard, based on attributes of the electronic form with which the user is interacting. In FIG. 1, the components follow a particular design architecture. In alternative embodiments, different architectures may be used to provide dynamically customized, general purpose, virtual keyboards. For instance, instead of using a central virtual keyboard module that contains the parsing engine, the layout engine, and the input manager as subcomponents, the functionality may be implemented using a virtual keyboard system that uses two or more peer modules that cooperate to provide a dynamically customized, general purpose, virtual keyboard. In addition, some of the functionality may be provided by other modules. For example, some or all of the functions of the input manager may be implemented as part of a text subsystem, as part of the OS, or as part of some other module. Likewise, some or all of the functions of the parsing engine and other components may be implemented as part of some other module. Many additional variations may be used in different embodiments to provide the functionality described herein.

FIGS. 4A-4D present block diagrams that illustrate components for providing virtual keyboards according to various alternative embodiment architectures 410-425. For instance, according to architecture 410, the virtual keyboard manager, the parsing engine, the layout engine, and the input manager are implemented as relatively independent siblings at the same hierarchical level as the OS. Architecture 411 is similar, but the layout engine is implemented as part of the virtual keyboard module. Architecture 412 is similar to architecture 411, but the parsing engine is implemented as part of the input manager. Architecture 413 is similar to architecture 411, but the virtual keyboard module is implemented as part of the layout engine. In this hierarchy, the layout engine may also select from multiple different virtual keyboard modules. Architecture 414 is like architecture 413, but the parsing engine is implemented as part of the input manager. In this hierarchy as well, the layout engine may select from multiple different virtual keyboard modules. Architecture 415 is like architecture 411, but the input manager is also implemented as part of the virtual keyboard module. For architectures 410-415, the components are not part of the OS directly.

In architecture 416, the components are implemented as relatively independent siblings within the OS. Architecture 417 is like architecture 416, but the layout engine is implemented as part of the virtual keyboard module. Architecture 418 is like architecture 417, but the parsing engine is implemented as part of the input manager. Architecture 419 is like architecture 416, but the virtual keyboard module is implemented as part of the layout engine. Architecture 420 is like architecture 419, but the parsing engine is implemented as part of the input manager. For architectures 419 and 420, the layout engine may select from multiple virtual keyboards. Architecture 421 is like the architecture depicted in FIG. 1, but the virtual keyboard module is implemented as part of the OS. Architecture 422 is like architecture 421, but the parsing engine is implemented relatively independently of the virtual keyboard module.

In architectures 423-425, one or more of the components for providing virtual keyboards are implemented as part of an application. For instance, according to architecture 423, the parsing engine is implemented as part of the application, with the other components implanted according to X, where X matches any architecture from the set including architectures 410-422 (where the parsing engine from those architectures is replaced by the parsing engine within the application). Similarly, for architecture 424, Y denotes any architecture from the set including architectures 410-422 (where the virtual keyboard module, the layout engine, and the parsing engine from those architectures is replaced by the virtual keyboard module, the layout engine, and the parsing engine from architecture 424. Likewise, for architecture 425, Z denotes any architecture from the set including architectures 410-422 (where the virtual keyboard module, the layout engine, and the parsing engine from those architectures is replaced by the virtual keyboard module, the layout engine, and the parsing engine from architecture 425.

Various different programming languages or combinations of programming languages and such may be used to implement the necessary components in various different environments. For instance, a combination of C and C++ may be used, as well as UI hooks specific to each UI technology (e.g., JavaScript for hypertext markup language (HTML), Qt Meta Language or Modeling Language (QML) and C++ for QML, etc.). Implementation details may also vary for implementations designed for different platforms or devices, such as devices which use the Android OS, devices which use the iPhone OS, devices which use the Windows CE OS, etc.

Figure 2A:
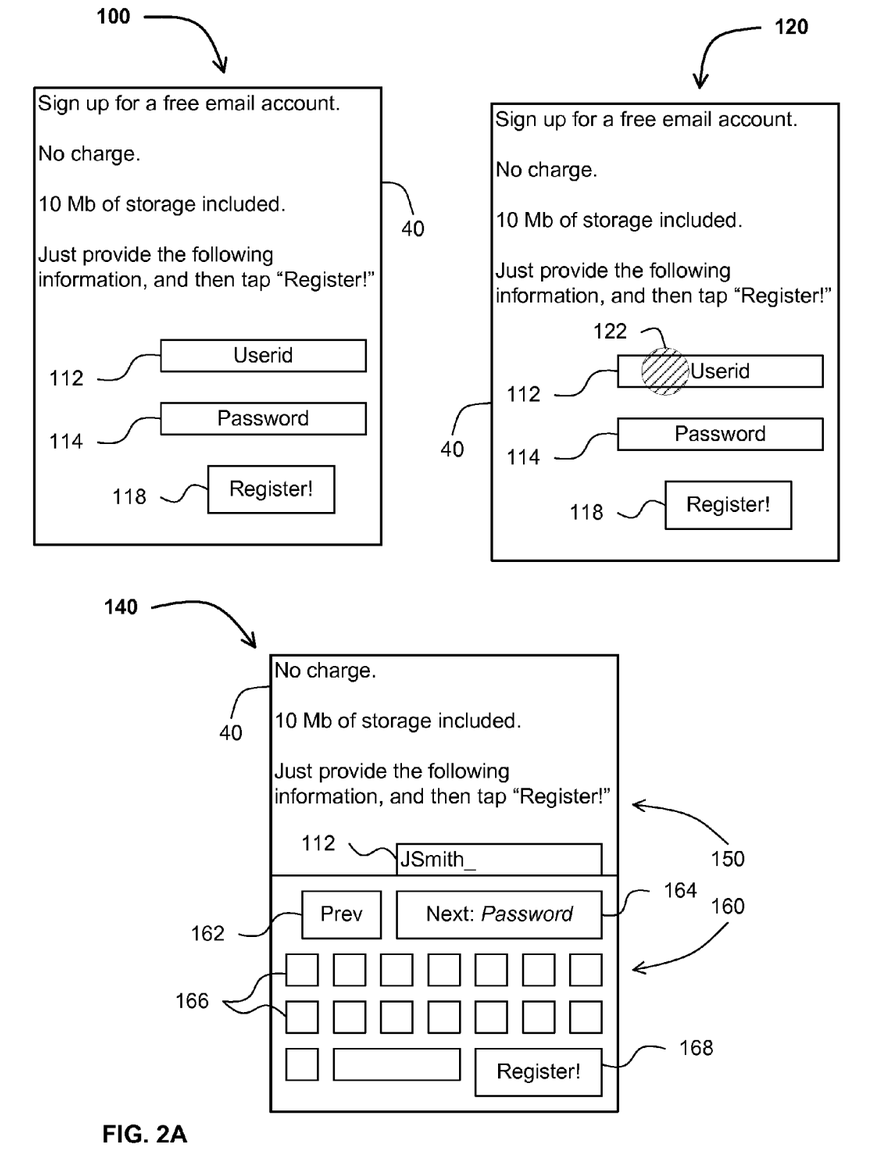
FIGS. 2A, 2B, and 2C provide schematic diagrams depicting various output configurations according to at least one example embodiment.
Figure 2B:
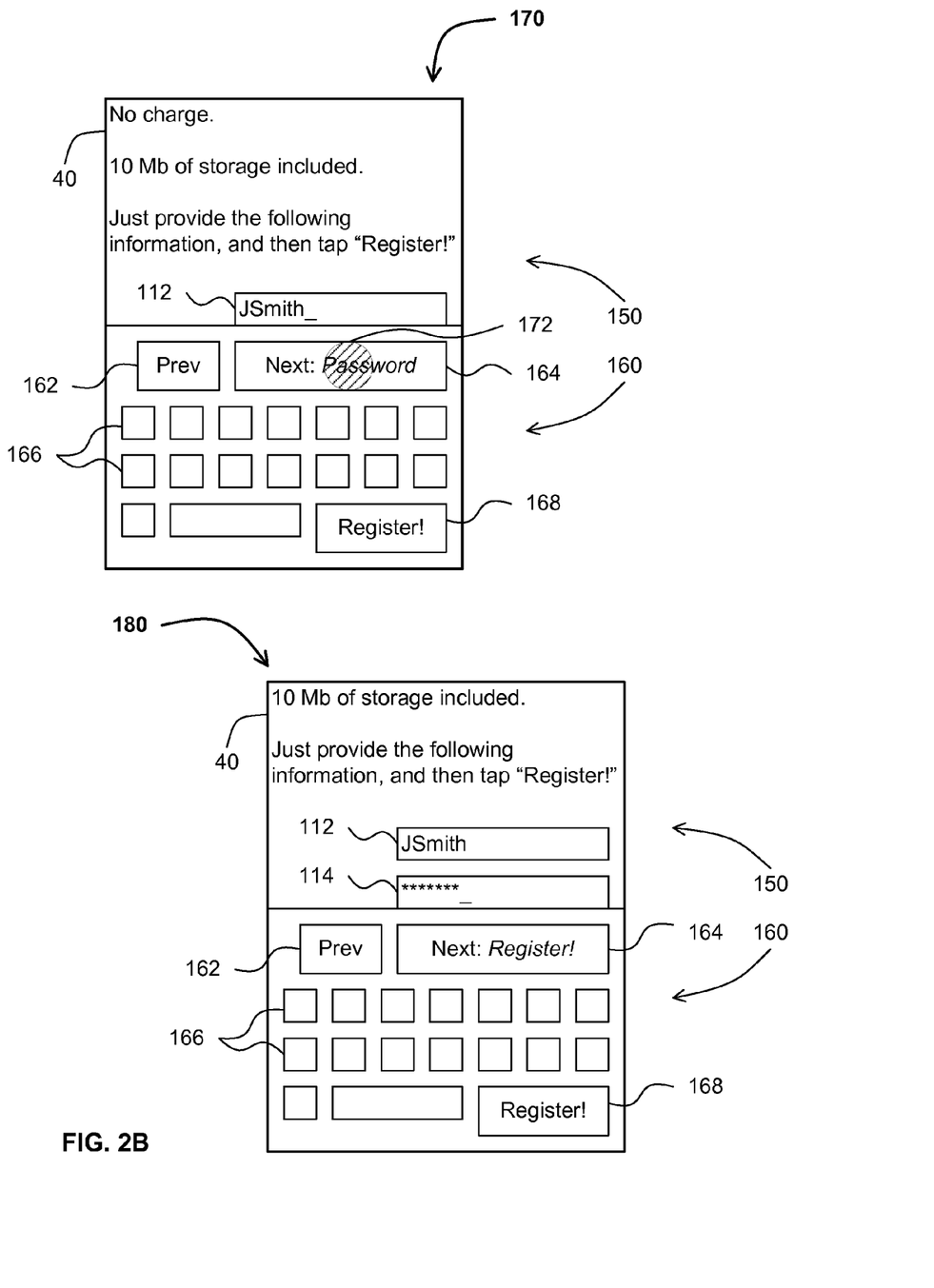
Figure 2C:
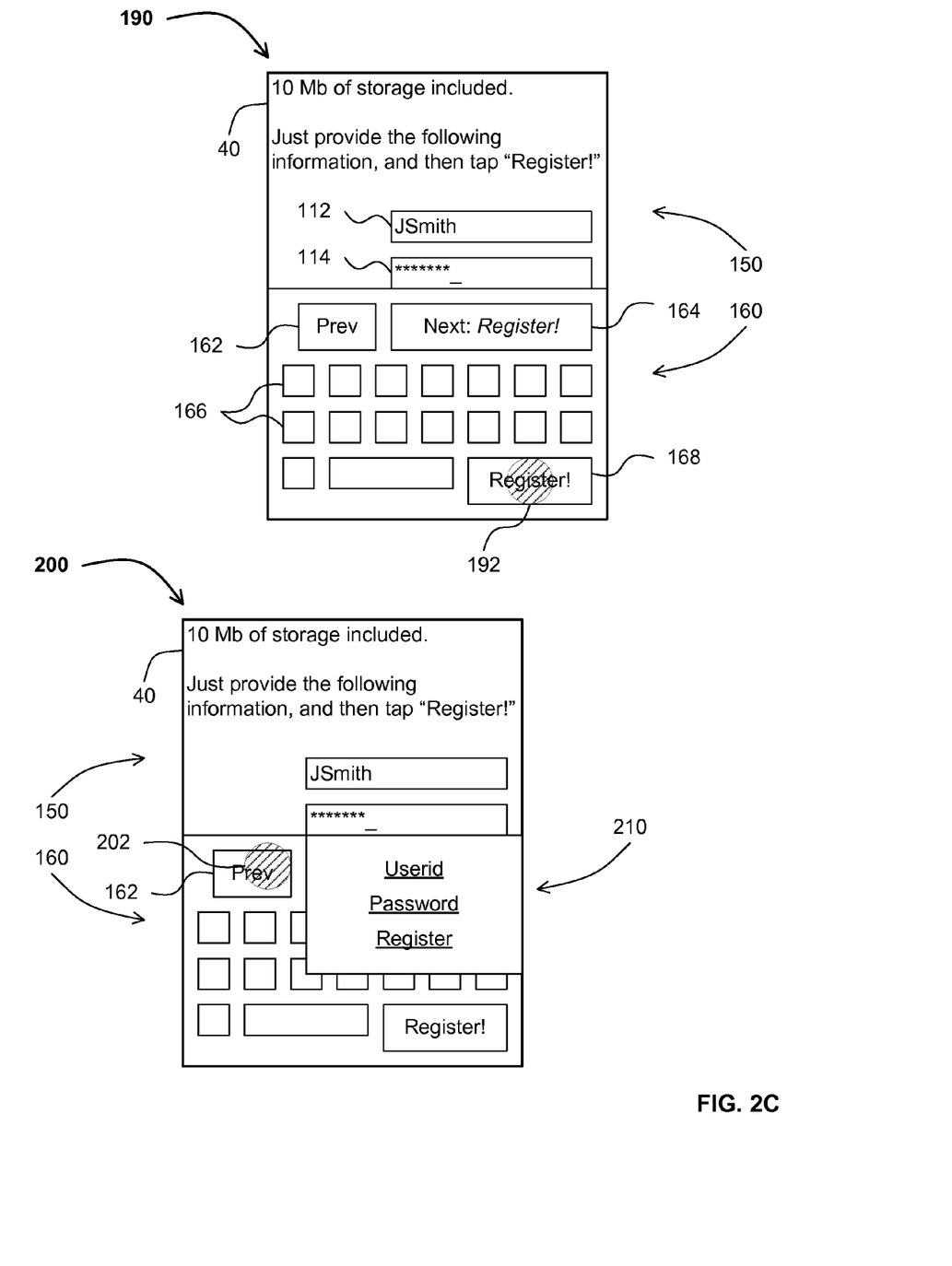

FIGS. 2A, 2B, and 2C present schematic diagrams depicting various output configurations on display 40 of mobile device 20. For instance, FIG. 2A depicts a sequence of graphical user interface (GUI) screens presented on display 40 by application 52, in cooperation with OS 50 and virtual keyboard module 60. Application 52 may be a web browser application, or a different kind of application that allows for user input. For purposes of illustrating one or more features of one or more embodiments of the present invention, the illustrated screens depict various options and operations that enable the user to sign up for an email account. Of course, the same features, similar features, and/or related features could be used for many other purposes by many different kinds of applications.

Screen 100 in FIG. 2A depicts a window that uses all of the real estate on display 40 to display various items for the user. Those items include some textual explanations and instructions, followed by two text fields 112 and 114, and a command button 118. For purposes of this disclosure, the term "text field" or "text box" denotes an input field that accepts alphabetic input, numeric input, or both alphabetic and numeric (alphanumeric) input. In FIGS. 2A through 2C, text field 112 is for receiving a userid from the user, and text field 114 is for receiving a password from the user. Command button 118 is for triggering a registration function or event after the user has entered a userid and a password. For purposes of this disclosure, objects which accept alphabetic or numeric input (e.g., text fields 112 and 114) may be referred to as textual input fields or textual input objects. By contrast, input objects which do not accept alphabetic or numeric input may be referred to as non-textual input objects. Similarly, virtual keyboard components other than textual buttons (such as alphabetic buttons and numeric buttons) may be referred to as non-textual virtual keyboard components.

As shown by the slashed circle 122 on screen 120, to begin entering a userid, the user may tap on text field 112.

In response, as shown on screen 140, virtual keyboard module 60 may open a keyboard window 160 over the bottom half of display 40, leaving an abbreviated electronic form window 150 at the top of display 40. (By contrast, electronic form window 150 is not shown in screen 120, since form window 150 is in that case coextensive with (i.e., occupies all of) display 40. For purposes of this disclosure, keyboard window 160 may also be referred to as virtual keyboard 160. As shown in screen 140, when virtual keyboard 160 is open or active, some important parts of the electronic form being used by application 52 for user input are not visible in electronic form window 150.

However, before virtual keyboard module 60 displays virtual keyboard 160, virtual keyboard module 60 performs a variety of operations to dynamically adapt virtual keyboard 160, based on attributes of the electronic form being used.

Figure 3:
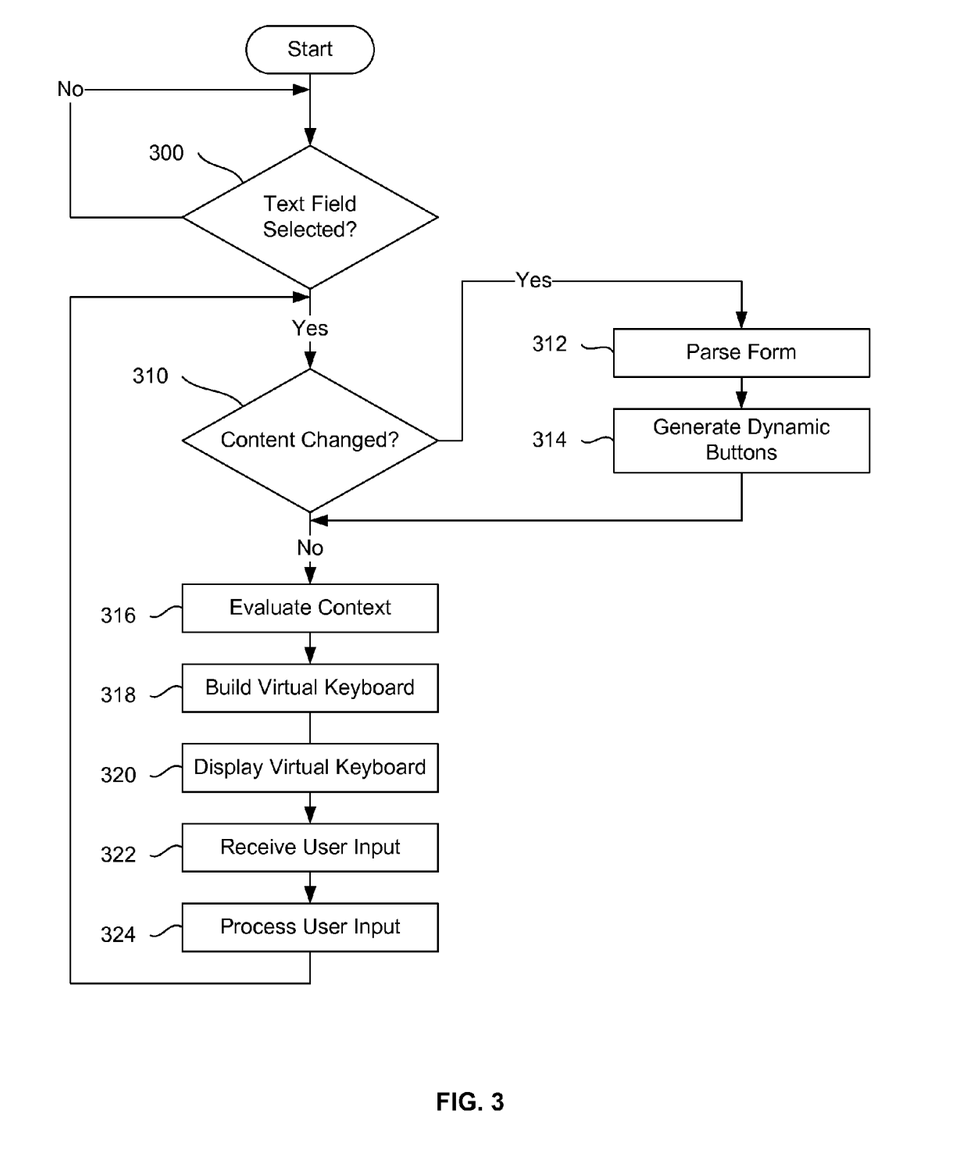
FIG. 3 presents a flowchart of a process for dynamically adapting a virtual keyboard according to at least one example embodiment.
Figure 4A:
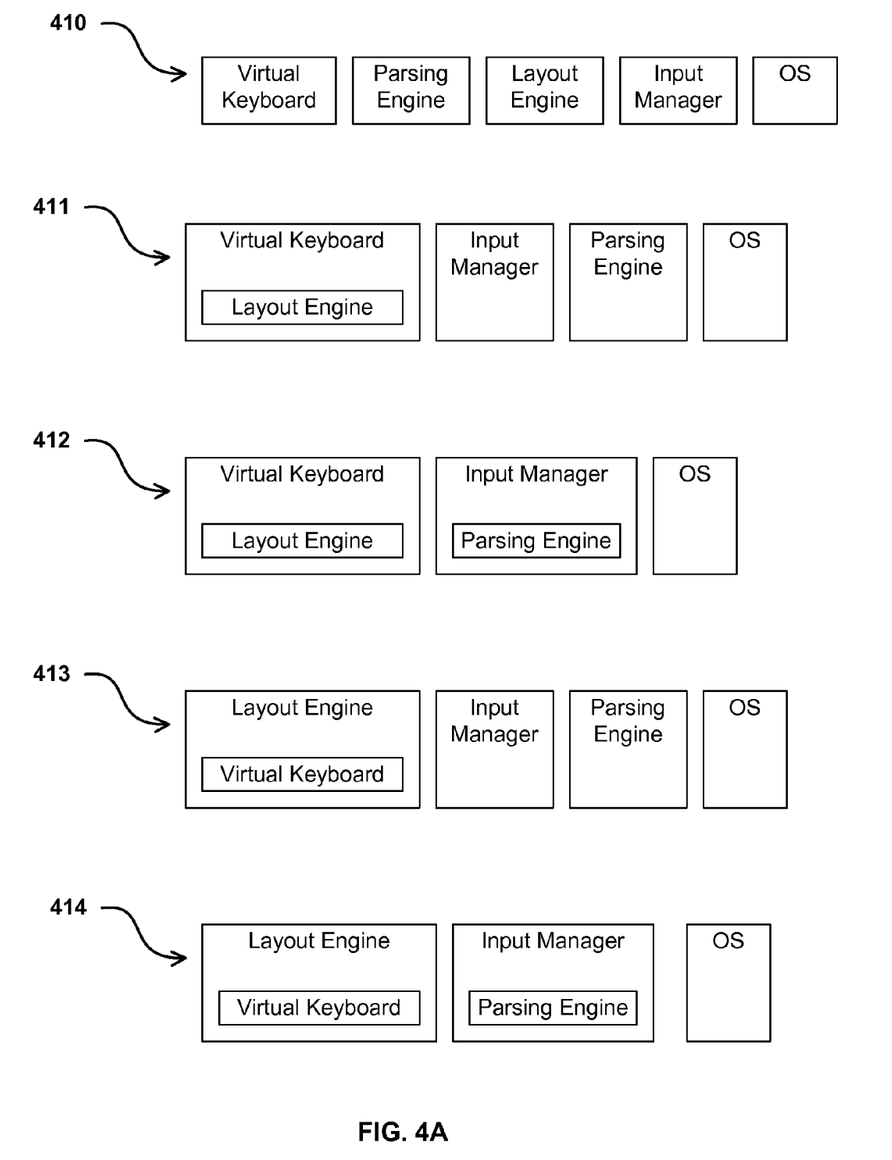
FIGS. 4A through 4D present block diagrams that illustrate components for providing virtual keyboards according to various alternative embodiments.
Figure 4B:
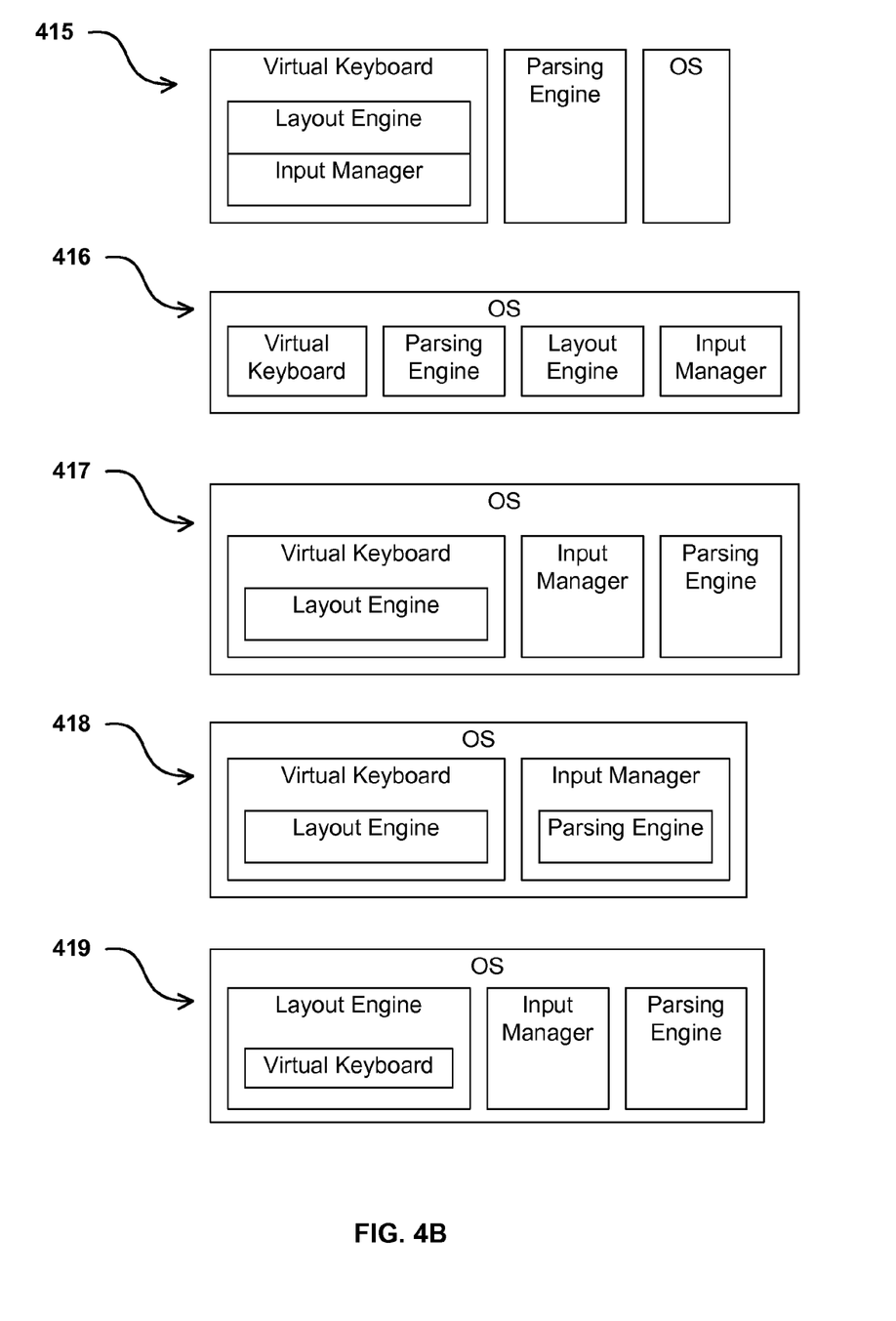
Figure 4C:
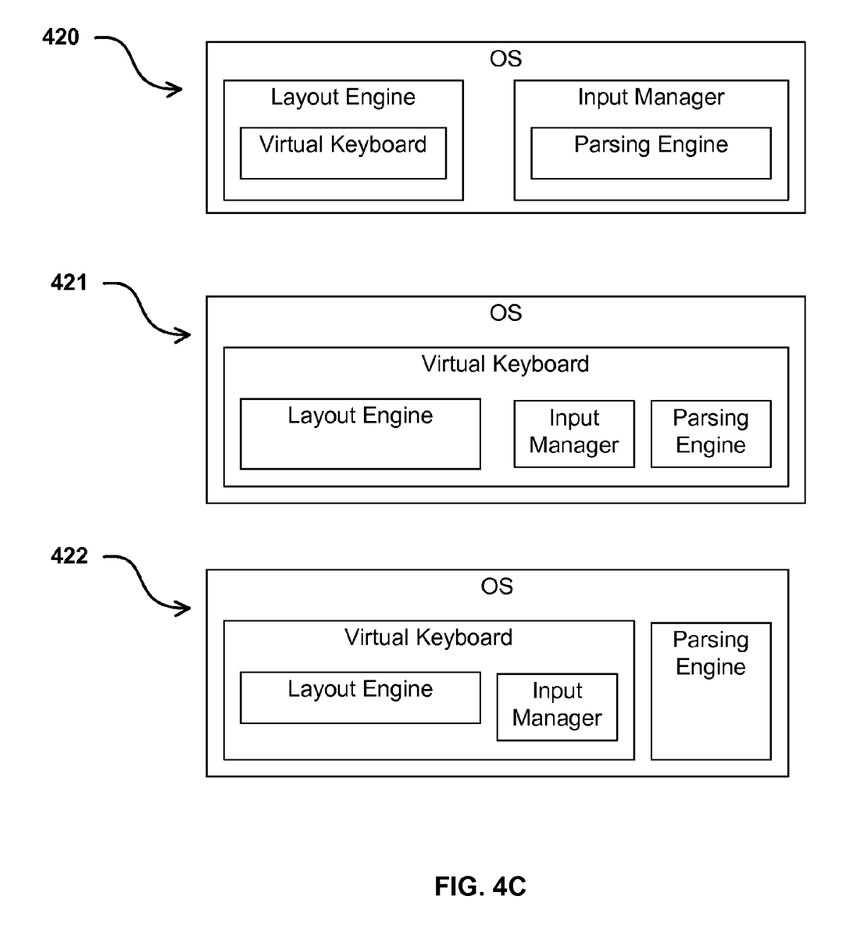
Figure 4D:
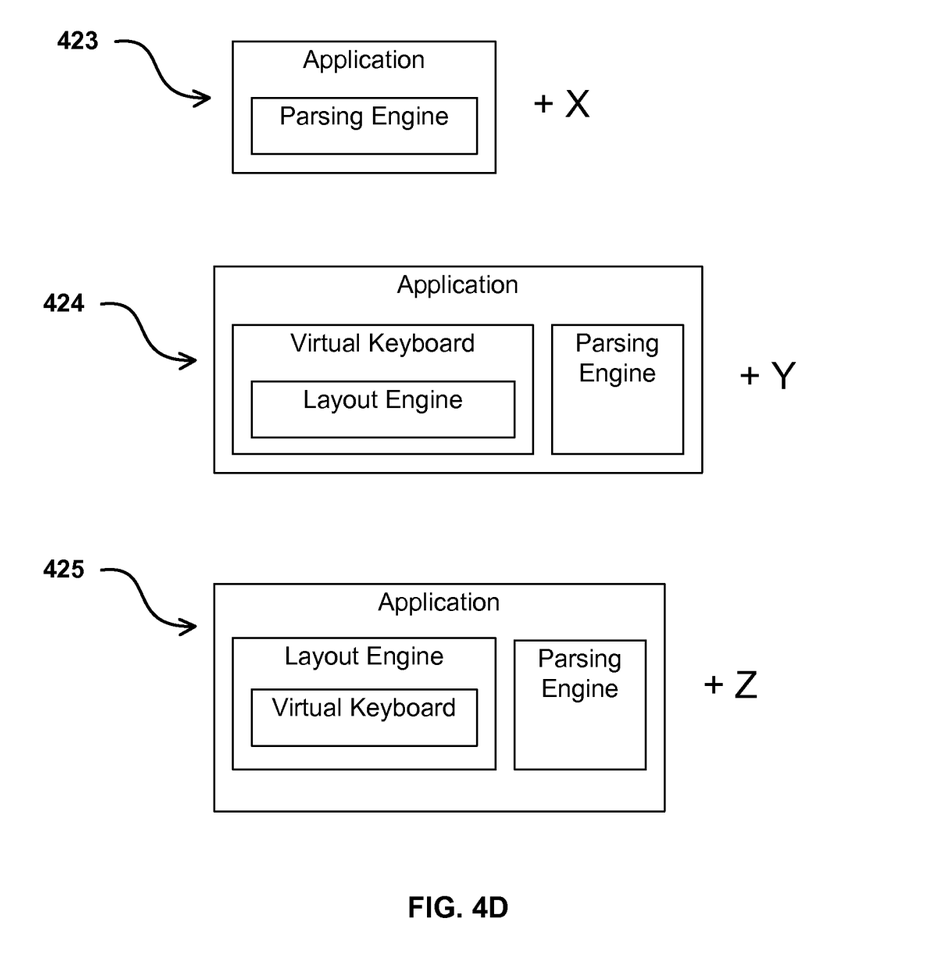

FIG. 3 presents a flowchart of a process for dynamically adapting a virtual keyboard according to at least one example embodiment. The illustrated process may begin when the user taps on a text field of an electronic form, such as text field 112, for example. As shown at block 300, in response to detecting a tap on a text field, mobile device 20 will pass control to virtual keyboard module 60. As shown at block 310, virtual keyboard module 60 may then determine whether the content of the electronic form has changed. For instance, if the virtual keyboard module 60 is being invoked for the first time for the current electronic form, virtual keyboard module 60 will conclude that the content has changed. Also, virtual keyboard module 160 may conclude that the content has changed if (a) a component providing information to the form provides updated data; (b) loss of network connectivity is detected for a form that is sourced from one or more online sources, or for a form that needs a connection to accept user input or to proceed with user input; or (c) other changes are detected.

If the content has changed, parsing engine 62 may parse the electronic form, as shown at block 312. In particular, parsing engine 62 identifies or recognizes different input objects or widgets in the form, and records various attributes associated with those objects. For instance, for the electronic form shown in screen 100 in FIG. 2A, parsing engine 62 may record that the form includes text field 112, that text field 112 is labeled "UserID", and that text field 112 accepts alphanumeric data up to a certain length. Parsing engine 62 may record similar information for text field 114. Parsing engine 62 may also record that the electronic form includes command button 118, that command button 118 is labeled "Register!", and that command button 118 is configured to trigger a particular event or function when selected. In other instances, electronic forms may include many other kinds of input objects, and parsing engine 62 may record the relevant attribute for those objects. The input objects for which parsing engine 62 may extract attributes include, without limitation, the following types of objects: dropdown lists, combo boxes, date fields, time fields, numeric fields, addresses, colors, maps, contacts, uniform resource locators (URLs) or other file pathways, audio/video objects, signatures, and handwriting inputs (e.g., Kanji letter input).

Parsing engine 62 may also record attributes for input objects, based on tags associated with those objects. For instance, an electronic form may include class tags to identify input objects as being for the input of a particular kind of data. Those class tags may follow the conventions of a particular microformat, for example. For instance, geographic coordinates can be represented by the following tag set and classes in an HTML document:

```
Meet at <span class="geo">
    <span class="latitude">52.48</span>,
    <span class="longitude">-1.89</span>
</span>
```

An electronic form written in HTML can use the same classes to encode a set of boxes that ask the user to enter a precise location:

```
Meet at <form class="geo">
    <input type="textbox" class="latitude" name="lat">52.48</input>,
    <input type="textbox" class="longitude" name="long">-1.89
    </input>
    <input type="submit"/>
</form>
```

When parsing that form, parsing engine 62 may record that input field "lat" is for a latitude coordinate and input field "long" is for a longitude coordinate. Similar techniques may be used to parse electronic forms with input fields for specifying location as an address, and for parsing forms with other types of input fields.

While or after parsing the electronic form, parsing engine 62 may arrange some or all of the extracted information in one or more lists, to be used for generating dynamic buttons for the virtual keyboard. For instance, when parsing the electronic form from screen 120, parsing engine 62 may generate the following structured list of UI element descriptions:

<1, Userid, textbox, focus>
<2, Password, textbox, nofocus>
<3, Register!, submit, nofocus>

Parsing engine 62 may also populate the structured list of UI element descriptions with state information, such as whether or not a checkbox was filled, what item was selected in a dropdown list, etc. In addition, the parsing engine may populate the list with contextual information based on previous usage. For example, parsing engine 62 may create a list or tree of state data that includes information about previous entries typed into a textbox.

When the electronic form is a structured UI, parsing engine 62 may examine the object storage of the UI framework that describes the final layout on the screen to extract the relevant input objects and attributes from the form. Structured UIs include, without limitation, interfaces based on HTML, interfaces based on QML, interfaces based on the GNU Image Manipulation Program (GIMP) toolkit (GTK), interfaces based on the Enlightenment Foundation Libraries (EFL), interfaces based on the Clutter software library, and interfaces based on the Extensible Application Markup Language (XAML). If the electronic form is not a structured UI, parsing engine 62 may examine other aspects of the form to extract the relevant input objects and attributes.

After parsing the electronic form, or after deciding that the content has not changed, the process passes to block 316, with virtual keyboard module 60 evaluating the current application context and system context associated with the form. For instance, for application context, virtual keyboard module 60 may evaluate which input object has focus. For system context, virtual keyboard module 60 may determine what type of application is using the electronic form or what the general purpose of the person using that application is. For instance, virtual keyboard module 60 may decide that the purpose of the user is to take a picture, to create a contact entry, or to achieve some other end result.

Thus, in at least one embodiment, a virtual keyboard module automatically detects control semantics, or meanings, of input objects of an electronic form and dynamically adapts the input layout for a virtual keyboard, based on the detected control semantics. A control has a particular meaning when used within a particular context. The virtual keyboard module may recognize this meaning and translate it into additional functionality within the virtual keyboard. For example, an email client can use a plain text box to get a "To:" address from the user. The developer can go beyond this basic functionality and declare the text box as an "email input" field. The added declaration provides additional semantics or meaning, which then enables the text box to carry out input validation, for example, to make sure that the user enters a correct email address. A virtual keyboard module according to the present disclosure may use these and other kinds of control semantics to provide better virtual keyboards. Further, the virtual keyboard module may infer new control semantics or meanings, based on electronic form layout. For example, an email client may present a form with "To:," "Subject," and "Body" fields and a "Send" button. The copy of the "Send" button in the keyboard, while being featured as a default action for the form, can disable itself if the "To:" field does not include a valid email address.

Also, any interaction by the user with the system, or with the virtual keyboard, as well as general context changes in the system, may result in virtual keyboard module 60 rescanning and reparsing the electronic form and dynamically changing the virtual keyboard. As an example of system context change, if a background installation completes which provides a new input mode (e.g., a map location picker) and if the user is interacting with an electronic form that has an input object which correlates to an address entry, virtual keyboard module 60 may dynamically add the map location picker to the virtual keyboard.

As shown at block 318, after virtual keyboard module 60 parses the electronic form and evaluates the context, layout engine 64 uses the parsing results and the extracted context data to figure out which dynamic virtual keyboard components should be included in the virtual keyboard. In other words, layout engine 64 determines the virtual keyboard layout and presentation, based on the structured list of UI elements and the extracted context data.

For instance, referring again to screen 120 in FIG. 2A, when the user taps on text field 112, virtual keyboard module 60 may respond by using parsing engine 62 to parse the electronic form and analyze the context, as described above, and then by using layout engine 64 to dynamically determine, based on the results of the parsing and analysis, which virtual keyboard components should be included in the virtual keyboard. For example, with regard to screen 120, layout engine 64 may determine that the virtual keyboard should have the following virtual keyboard components:

a) navigation buttons (e.g., "Prev" and "Next") for moving focus from the current input object to the previous or next input objects;
b) the label for the next input object, displayed in the "Next" navigation button (either with or without other text, such as "Next:");
c) more or less conventional alphanumeric virtual keys;
d) a command button for triggering the event or action associated with the "Register!" command button on the electronic form; and
e) the label for the "Register!" button, displayed in the corresponding command button in the virtual keyboard.

Layout engine 64 may decide that navigation buttons should be included in response to determining that the electronic form includes more than one input object in general or more than one text field in particular.

As shown at block 320, input manger 66 may then cause a dynamically adapted virtual keyboard that includes those features to be presented on display 40. For instance, as shown in screen 140 of FIG. 2A, input manger 66 may display a virtual keyboard 160 that includes a "Prev" or "Previous" navigation button 162, a "Next" navigation button 164, and various more or less conventional alphanumeric buttons 166. As shown, input manger 66 may also include a "Register!" command button 168 in virtual keyboard 160. Furthermore, input manger 66 may configure command button 168 in a manner that causes the function or event associated with command button 118 to be invoked in response to user selection of command button 168.

In other embodiments, or when used with other electronic forms, the input manager may add other kinds of dynamic virtual keyboard components to the virtual keyboard. Such virtual keyboard components may include, without limitation, objects of the following types: dropdown lists, combo boxes, date fields, time fields, spinners (numeric fields that have up and down arrows associated with them), address pickers, color pickers, address picker maps, contact pickers, file browsers, audio/video pickers with preview, signature pads, and handwriting inputs (e.g., for Kanji character input).

Referring again to screen 140, input manger 66 may also place the focus in text field 112. For purposes of this disclosure, navigation control involves controlling which input object has focus. By contrast, cursor control involves controlling the location of the cursor or caret within an input field.

Referring again to FIG. 3, input manager 66 may then receive user input and process that user input, as indicated at blocks 322 and 324. The process may then return to block 310 with virtual keyboard module 60 determining whether the content of the electronic form has changed and performing other operations, as described above. As shown at blocks 318 and 320, virtual keyboard module 60 may then continue to dynamically adapt or modify virtual keyboard 160.

For instance, when processing the user input, input manager 66 may populate text field 112 with input (e.g., "J Smith"), based on the alphanumeric buttons tapped by the user. Then, when the user taps on the "Next" button (as shown in screen 170 of FIG. 2B, with slashed circle 172), input manager 66 may automatically scroll the electronic form upwards until text field 114 is visible above virtual keyboard 160 and place the focus in that text field. In addition, layout engine 64 may modify the "Next" and "Previous" buttons accordingly. For instance, layout engine 64 may update the text in navigation button 164 with "Register!", to indicate that the user can shift focus to command button 118 by tapping navigation button 164. In another embodiment, layout engine 64 includes labels from the corresponding input objects in both the "Previous" and "Next" buttons.

As shown in screen 180, while the focus is at text field 114, input manager 66 may populate text field 114 with input, based on the alphanumeric buttons tapped by the user.

Furthermore, as shown by the slashed circle 192 in screen 190 of FIG. 2C, the user can tap the dynamically generated "Register!" command button 168 within virtual keyboard 160 to trigger the registration function, even though the original "Register" command button 118 from the electronic form is not visible on screen 40. In response to detecting that the user has tapped command button 168, input manager 66 may automatically invoke the function or event originally associated with command button 118.

In addition, virtual keyboard module 60 may provide additional features to improve the user experience when interacting with electronic forms on mobile device 20. For example, virtual keyboard module 60 may configure one or more of the virtual keyboard components with the ability to recognize two or more different modes of input (e.g., short tap and press-and-hold, or short tap and long tap), and virtual keyboard module 60 may provide for two or more different functions, depending on which input mode was used. For instance, virtual keyboard module 60 may equip the navigation buttons in virtual keyboard 160 with extra functionality to be invoked when the user presses and holds a navigation button, instead of merely tapping it. Slashed circle 202 in screen 200 represents the user pressing and holding navigation button 162. As shown in screen 200, in one embodiment, this extra or secondary functionality is to provide a pop-up menu 210 that lists all of the input objects in the form, enabling the user to easily shift focus directly to any desired object, simply by tapping the label for that field in the pop-up menu. In other embodiments, the virtual keyboard module may provide for other types of secondary functions.

As has been described, a parsing method may parse an electronic form in order to determine the presence of control semantics associated with input objects in the form. The method may also involve dynamically adapting a virtual keyboard in response to the types and attributes of those input objects.

According to one example embodiment, a virtual keyboard module parses an electronic form generated and presented by a software application. The software application may be a web browser, an email application, a word processor, or virtually any other kind of application. After parsing the electronic form and analyzing the context, the virtual keyboard module presents a virtual keyboard that is dynamically adapted to the form. For instance, the virtual keyboard module may add a specialized virtual keyboard component to the virtual keyboard, to be presented along with more or less conventional alphanumeric buttons. Alternatively, the virtual keyboard module may display a virtual keyboard that contains the specialized virtual keyboard component without any alphanumeric buttons. For instance, when focus moves to an input object on the electronic form associated with color selection, the virtual keyboard module may fill the virtual keyboard with a color picker. Alternatively, the virtual keyboard module may also include some other virtual keyboard components (e.g., navigation buttons and command buttons) in the virtual keyboard with the color picker.

The dynamic incorporation of virtual keyboard components may allow a user to navigate between text fields more efficiently, removing the need for a user to pan the form in order to activate a different text field. The dynamic virtual keyboard may also present the user with easier mechanisms for putting in data. Furthermore, the dynamic inclusion of command buttons like "Submit" or "Save" (or other virtual keyboard components) may allow a user to perform actions that would have otherwise required panning of the electronic form.

In the description above, certain features have been referred to as input objects. It should be understood, however, that the term "input object" is not limited to features implemented through object oriented programming, but also covers features for receiving user input implemented using other types of programming methodologies including, procedural programming methodologies, structural markup languages (e.g., HTML, XAML etc.), and other methodologies.

In light of the principles and example embodiments described and illustrated herein, it will be recognized that the illustrated embodiments can be modified in arrangement and detail without departing from such principles. Also, the foregoing discussion has focused on particular embodiments, but other configurations are contemplated. Also, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Also, components that are described as being in communication with each other or as being responsive to each other need not be in continuous communication with each other, unless expressly specified otherwise. It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. For example, alternative embodiments include machine accessible media encoding instructions or control logic for performing the operations of the invention. Such embodiments may also be referred to as program products. Such machine accessible media may include, without limitation, tangible storage media such as magnetic disks, optical disks, RAM, read only memory (ROM), flash memory, etc. In at least one embodiment, the instructions for all components may be stored in one non-transitory machine accessible medium. In at least one other embodiment, two or more non-transitory machine accessible media may be used for storing the instructions for the components. For instance, instructions for one component may be stored in one medium, and instructions another component may be stored in another medium. Alternatively, a portion of the instructions for one component may be stored in one medium, and the rest of the instructions for that component (as well instructions for other components), may be stored in one or more other media. Instructions may also be used in a distributed environment, and may be stored locally and/or remotely for access by single or multi-processor machines. In some embodiments, some or all of the control logic for implementing the described operations may be implemented in hardware logic (e.g., as part of an integrated circuit chip, a programmable gate array (PGA), an application specific integrated circuit (ASIC), etc.).

Similarly, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims and all equivalents to such implementations.

What is claimed is:

1. A method for providing a dynamically customized virtual keyboard, the method comprising:

in a first portion of a display of a mobile computing device, displaying at least part of an electronic form containing input objects to accept user input;

displaying a virtual keyboard in a second portion of the display, wherein the second portion of the display is distinct from the first portion of the display, and wherein the virtual keyboard comprises at least a first alphabetic button to enable a user to enter a first alphabetic character and a second alphabetic button to enable the user to enter a second alphabetic character;

automatically parsing the electronic form to discover attributes of at least one of the input objects in the electronic form;

automatically determining whether the electronic form includes a non-textual input object, based on results of the parsing; and in response to discovering that the electronic form includes a non-textual input object, automatically adding a corresponding non-textual virtual keyboard component to the virtual keyboard;

wherein displaying the virtual keyboard comprises displaying the virtual keyboard with the first and second alphabetic buttons and with the added non-textual virtual keyboard component in the second portion of the display; and wherein the added non-textual virtual keyboard component is configured to allow a user to invoke, from the virtual keyboard, a function associated with the corresponding non-textual input object in the electronic form.

2. A method according to claim 1, wherein:
the non-textual input object in the electronic form comprises a command button; and
the added non-textual virtual keyboard component in the virtual keyboard comprises a corresponding command button configured to allow the user to invoke, from the virtual keyboard, the function associated with the command button in the electronic form.

3. A method according to claim 1, wherein the non-textual input object in the electronic form comprises an object from the group consisting of a command button and a list box.

4. A method according to claim 1, wherein:
the operation of displaying at least part of the electronic form in the first portion of the display comprises displaying a first part of the electronic form that does not include the non-textual input object in the first portion of the display; and
the operation of displaying the virtual keyboard in the second portion of the display comprises displaying the virtual keyboard with the added non-textual virtual keyboard component in the second portion of the display, while the first part of the electronic form that does not include the non-textual input object is displayed in the first portion of the display.

5. A method according to claim 4, further comprising:
enabling the user to interact with the non-textual input object in the electronic form indirectly, via the virtual keyboard, even though the non-textual input object resides in a second, undisplayed part of the electronic form.

6. A method according to claim 1, wherein the electronic form comprises an input screen generated by a software application.

7. A method according to claim 6, wherein the software application comprises a web browser.

8. A method according to claim 1, wherein:
the operation of parsing the electronic form comprises discovering two or more input objects in the electronic form; and
the method further comprises automatically adding one or more navigation control buttons to the virtual keyboard in response to discovering two or more input objects in the electronic form.

9. A method according to claim 8, further comprising:
detecting that the user has selected one of the added navigation control buttons in the virtual keyboard;
in response, automatically moving focus to a different input object;
automatically determining whether the different input object is being presented in the display; and
in response to determining that the different input object is not being presented in the display, automatically scrolling the electronic form in the display, to cause the different input object to be presented in the display.

10. A method according to claim 9, wherein:
the two or more input objects comprise a first textual input field and a second textual input field; and
the operation of automatically moving focus to a different input object comprises automatically moving focus from the first textual input field to the second textual input field.

11. A method according to claim 1, wherein the method further comprises:
adding, to the virtual keyboard, a virtual keyboard component configured to cause, in response to user interaction with said virtual keyboard component, a list of input objects from the electronic form to be displayed in the virtual keyboard.

12. A method according to claim 11, further comprising:
detecting that the user has selected one of the input objects from the list displayed in the virtual keyboard; and
in response, automatically moving focus to the selected input object.

13. A method according to claim 11, further comprising:
detecting that the user has selected one of the input objects from the list displayed in the virtual keyboard;
in response, automatically moving focus to the selected input object;
automatically determining whether the selected input object is being presented in the display; and
in response to determining that the selected input object is not being presented in the display, automatically scrolling the electronic form in the display, to cause the selected input object to be presented in the display.

14. At least one non-transitory machine accessible medium comprising:
instructions that, when executed by a mobile computing device, enable the mobile computing device to perform operations comprising:
in a first portion of a display of the mobile computing device, displaying at least part of an electronic form containing input objects to accept user input;
displaying a virtual keyboard in a second portion of the display, wherein the second portion of the display is distinct from the first portion of the display, and wherein the virtual keyboard comprises at least a first alphabetic button to enable a user to enter a first alphabetic character and a second alphabetic button to enable the user to enter a second alphabetic character;
automatically parsing the electronic form to discover attributes of at least one of the input objects in the electronic form;

automatically determining whether the electronic form includes a non-textual input object, based on results of the parsing; and in response to discovering that the electronic form includes a non-textual input object, automatically adding a corresponding non-textual virtual keyboard component to the virtual keyboard;

wherein displaying the virtual keyboard comprises displaying the virtual keyboard with the first and second alphabetic buttons and with the added non-textual virtual keyboard component in the second portion of the display; and wherein the added non-textual virtual keyboard component is configured to allow a user to invoke, from the virtual keyboard, a function associated with the corresponding non-textual input object in the electronic form.

15. At least one non-transitory machine accessible medium according to claim 14, wherein:

the non-textual input object in the electronic form comprises a command button; and the added non-textual virtual keyboard component in the virtual keyboard comprises a corresponding command button configured to allow the user to invoke, from the virtual keyboard, the function associated with the command button in the electronic form.

16. At least one non-transitory machine accessible medium according to claim 14, wherein the non-textual input object in the electronic form comprises an object from the group consisting of a command button and a list box.

17. At least one non-transitory machine accessible medium according to claim 14, wherein:

the operation of displaying at least part of the electronic form in the first portion of the display comprises displaying a first part of the electronic form that does not include the non-textual input object in the first portion of the display; and the operation of displaying the virtual keyboard in the second portion of the display comprises displaying the virtual keyboard with the added non-textual virtual keyboard component in the second portion of the display, while the first part of the electronic form that does not include the non-textual input object is displayed in the first portion of the display.

18. At least one non-transitory machine accessible medium according to claim 17, wherein the instructions enable the mobile computing device to perform further operations comprising:

enabling the user to interact with the non-textual input object in the electronic form indirectly, via the virtual keyboard, even though the non-textual input object resides in a second, undisplayed part of the electronic form.

19. At least one non-transitory machine accessible medium according to claim 14, wherein the instructions enable the mobile computing device to perform further operations comprising:

adding, to the virtual keyboard, a virtual keyboard component configured to cause, in response to user interaction with said virtual keyboard component, a list of input objects from the electronic form to be displayed in the virtual keyboard.

20. At least one non-transitory machine accessible medium according to claim 19, wherein the instructions enable the mobile computing device to perform further operations comprising:

detecting that the user has selected one of the input objects from the list displayed in the virtual keyboard;

in response, automatically moving focus to the selected input object;

automatically determining whether the selected input object is being presented in the display; and in response to determining that the selected input object is not being presented in the display, automatically scrolling the electronic form in the display, to cause the selected input object to be presented in the display.

21. A mobile computing device comprising:

a processor;

a display responsive to the processor;

at least one local storage device responsive to the processor; and instructions in the local storage device that, when executed by the mobile computing device, enable the mobile computing device to perform operations comprising:

in a first portion of the display, displaying at least part of an electronic form containing input objects to accept user input;

displaying a virtual keyboard in a second portion of the display, wherein the second portion of the display is distinct from the first portion of the display, and wherein the virtual keyboard comprises at least a first alphabetic button to enable a user to enter a first alphabetic character and a second alphabetic button to enable the user to enter a second alphabetic character;

automatically parsing the electronic form to discover attributes of at least one of the input objects in the electronic form;

automatically determining whether the electronic form includes a non-textual input object, based on results of the parsing; and in response to discovering that the electronic form includes a non-textual input object, automatically adding a corresponding non-textual virtual keyboard component to the virtual keyboard;

wherein displaying the virtual keyboard comprises displaying the virtual keyboard with the first and second alphabetic buttons and with the added non-textual virtual keyboard component in the second portion of the display; and wherein the added non-textual virtual keyboard component is configured to allow a user to invoke, from the virtual keyboard, a function associated with the corresponding non-textual input object in the electronic form.

22. A mobile computing device according to claim 21, wherein:

the non-textual input object in the electronic form comprises a command button; and the added non-textual virtual keyboard component in the virtual keyboard comprises a corresponding command button configured to allow the user to invoke, from the virtual keyboard, the function associated with the command button in the electronic form.

23. A mobile computing device according to claim 21, wherein the non-textual input object in the electronic form comprises an object from the group consisting of a command button and a list box.

24. A mobile computing device according to claim 21, wherein:

the operation of displaying at least part of the electronic form in the first portion of the display comprises displaying a first part of the electronic form that does not include the non-textual input object in the first portion of the display; and the operation of displaying the virtual keyboard in the second portion of the display comprises displaying the virtual keyboard with the added non-textual virtual keyboard component in the second portion of the display, while the first part of the electronic form that does not include the non-textual input object is displayed in the first portion of the display.

25. A mobile computing device according to claim 24, wherein the instructions enable the mobile computing device to perform further operations comprising:

enabling the user to interact with the non-textual input object in the electronic form indirectly, via the virtual keyboard, even though the non-textual input object resides in a second, undisplayed part of the electronic form.

26. A mobile computing device according to claim 21, wherein the instructions enable the mobile computing device to perform further operations comprising:

adding, to the virtual keyboard, a virtual keyboard component configured to cause, in response to user interaction with said virtual keyboard component, a list of input objects from the electronic form to be displayed in the virtual keyboard.

27. A mobile computing device according to claim 26, wherein the instructions enable the mobile computing device to perform further operations comprising:

detecting that the user has selected one of the input objects from the list displayed in the virtual keyboard;

in response, automatically moving focus to the selected input object;

automatically determining whether the selected input object is being presented in the display; and in response to determining that the selected input object is not being presented in the display, automatically scrolling the electronic form in the display, to cause the selected input object to be presented in the display.

\* \* \* \* \*